United States Patent
Bou-Ghannam et al.

(10) Patent No.: US 11,361,283 B2
(45) Date of Patent: *Jun. 14, 2022

(54) SYSTEM AND METHOD FOR DYNAMIC DISCOVERY AND ENHANCEMENTS OF DIAGNOSTIC RULES

(71) Applicant: International Business Machines Corporation, Armonk, NY (US)

(72) Inventors: Akram Bou-Ghannam, Lake Worth, FL (US); Kalman Gyimesi, Richmond, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 372 days.

This patent is subject to a terminal disclaimer.

(21) Appl. No.: 14/799,082

(22) Filed: Jul. 14, 2015

(65) Prior Publication Data

US 2017/0017931 A1    Jan. 19, 2017

(51) Int. Cl.
| | |
|---|---|
| *G06Q 10/00* | (2012.01) |
| *G06Q 50/00* | (2012.01) |
| *G07C 5/00* | (2006.01) |
| *G07C 5/08* | (2006.01) |

(52) U.S. Cl.
CPC ............ *G06Q 10/20* (2013.01); *G06Q 50/01* (2013.01); *G07C 5/008* (2013.01); *G07C 5/0808* (2013.01)

(58) Field of Classification Search
CPC ........ G06Q 10/20; G06Q 50/01; G07C 5/008; G07C 5/0808
See application file for complete search history.

(56) References Cited

U.S. PATENT DOCUMENTS

| | | | |
|---|---|---|---|
| 8,600,831 B2 | 12/2013 | Xiao et al. | |
| 2005/0015678 A1* | 1/2005 | Miller | G06F 11/2294 714/38.14 |
| 2006/0095230 A1* | 5/2006 | Grier | G05B 23/0216 702/183 |
| 2008/0294690 A1* | 11/2008 | McClellan | G01S 5/0027 |
| 2010/0030586 A1* | 2/2010 | Taylor | G06Q 40/08 705/4 |

(Continued)

OTHER PUBLICATIONS

S. Singh, C. Pinion and H. S. Subramania, "Data-driven framework for detecting anomalies in field failure data," 2011 Aerospace Conference, 2011, pp. 1-14, doi: 10.1109/AERO.2011.5747580. (Year: 2011).*

(Continued)

*Primary Examiner* — Richard W. Crandall
*Assistant Examiner* — Wenren Chen
(74) *Attorney, Agent, or Firm* — Stephen J. Walder, Jr.; Randdy E. Tejeda

(57) ABSTRACT

A complex asset analysis operation, comprising: receiving data from a plurality of crowd sourced complex assets; aggregating the data received from the plurality of crowd sourced complex assets; and, performing a complex asset analysis operation based upon the data received from the plurality of crowd sourced devices, the complex asset analysis operation providing an information brokerage function for a community of complex assets by managing shared information from the plurality of crowd sourced complex assets.

18 Claims, 4 Drawing Sheets

(56) References Cited

U.S. PATENT DOCUMENTS

| | | | |
|---|---|---|---|
| 2011/0225096 A1* | 9/2011 | Cho | G06Q 10/20 |
| | | | 705/305 |
| 2011/0238258 A1* | 9/2011 | Singh | G07C 5/0808 |
| | | | 701/31.4 |
| 2014/0101058 A1 | 4/2014 | Castel et al. | |
| 2014/0277902 A1* | 9/2014 | Koch | G07C 5/008 |
| | | | 701/29.1 |
| 2014/0358357 A1* | 12/2014 | Jones | G07C 5/0808 |
| | | | 701/32.7 |
| 2014/0358623 A1 | 12/2014 | Vukovic et al. | |
| 2015/0109145 A1* | 4/2015 | Marathe | G08G 1/096716 |
| | | | 340/901 |
| 2017/0017934 A1 | 1/2017 | Bou-Ghannam et al. | |

OTHER PUBLICATIONS

R. High, "The Era of Cognitive Systems: An Inside Look at IBM Watson and How it Works," IBM Redbooks, 2012.

Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Lifehacker, How to Unlock a Treasure Trove of Useful Data from Your Car, http://lifehacker.com/how-to-unlock-a-treasure-trove-of-useful-data-from-your-1563366446, printed Apr. 20, 2015.

Caterpillar Marine, Dicare, http://marine.cat.com/dicare, printed Jul. 13, 2015.

P. Pineda, Azcentral, Crowdsourcing success surprises Deer Valley tech-tools developer, http://www.azcentral.com/story/news/local/phoenix/2014/02/24/crowdsourcing-success-surprises-deer-valley-tech-tools-developer/5781555/, Feb. 24, 2014.

List of IBM Patents or Applications Treated as Related.

"Crowdsourcing Car Innovation", Ford Motor Company, https://www.ford.com/innovation/crowd-sourcing-car-innovation/, accessed online Aug. 10, 2020, 7 pages.

\* cited by examiner

SYSTEM AND METHOD FOR DYNAMIC DISCOVERY AND ENHANCEMENTS OF DIAGNOSTIC RULES

BACKGROUND OF THE INVENTION

Field of the Invention

The present invention relates to information handling systems. More specifically, embodiments of the invention relate to dynamic discover and enhancements of diagnostic rules.

Description of the Related Art

People and companies own and operate complex assets such as automobiles, airplanes, ships, machinery and manufacturing equipment, etc. Owners and operators are often concerned with the health of these complex engineering assets and desire access to information and insights when it comes to making maintenance and repair decisions about their complex engineering assets. Known diagnostics systems (both on-board and off-board) are getting smarter and can provide owners as well as repair and maintenance personnel with a fair amount of insight relative to the health of the asset.

For example, certain known diagnostic systems for complex assets such as automobiles, are sophisticated and costly tools that are mainly available to repair shops and major vehicle dealerships and not directly to owners of the vehicle. The diagnostic systems employ software that encodes diagnostics rules to aid in diagnosing and repairing vehicle problems. With these diagnostic systems, the diagnostics rules are encoded at design and development time by engineers and subject matter experts using component reliability data and experience from subject matter experts.

SUMMARY OF THE INVENTION

In one embodiment, the invention relates to a computer-implementable method for performing a complex asset analysis operation, comprising: receiving data from a plurality of crowd sourced complex assets; aggregating the data received from the plurality of crowd sourced complex assets; and, performing a complex asset analysis operation based upon the data received from the plurality of crowd sourced devices, the complex asset analysis operation providing an information brokerage function for a community of complex assets by managing shared information from the plurality of crowd sourced complex assets.

In another embodiment, the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving data from a plurality of crowd sourced complex assets; aggregating the data received from the plurality of crowd sourced complex assets; and, performing a complex asset analysis operation based upon the data received from the plurality of crowd sourced devices, the complex asset analysis operation providing an information brokerage function for a community of complex assets by managing shared information from the plurality of crowd sourced complex assets.

In another embodiment, the invention relates to a computer-readable storage medium embodying computer program code, the computer program code comprising computer executable instructions configured for: receiving data from a plurality of crowd sourced complex assets; aggregating the data received from the plurality of crowd sourced complex assets; and, performing a complex asset analysis operation based upon the data received from the plurality of crowd sourced devices, the complex asset analysis operation providing an information brokerage function for a community of complex assets by managing shared information from the plurality of crowd sourced complex assets.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
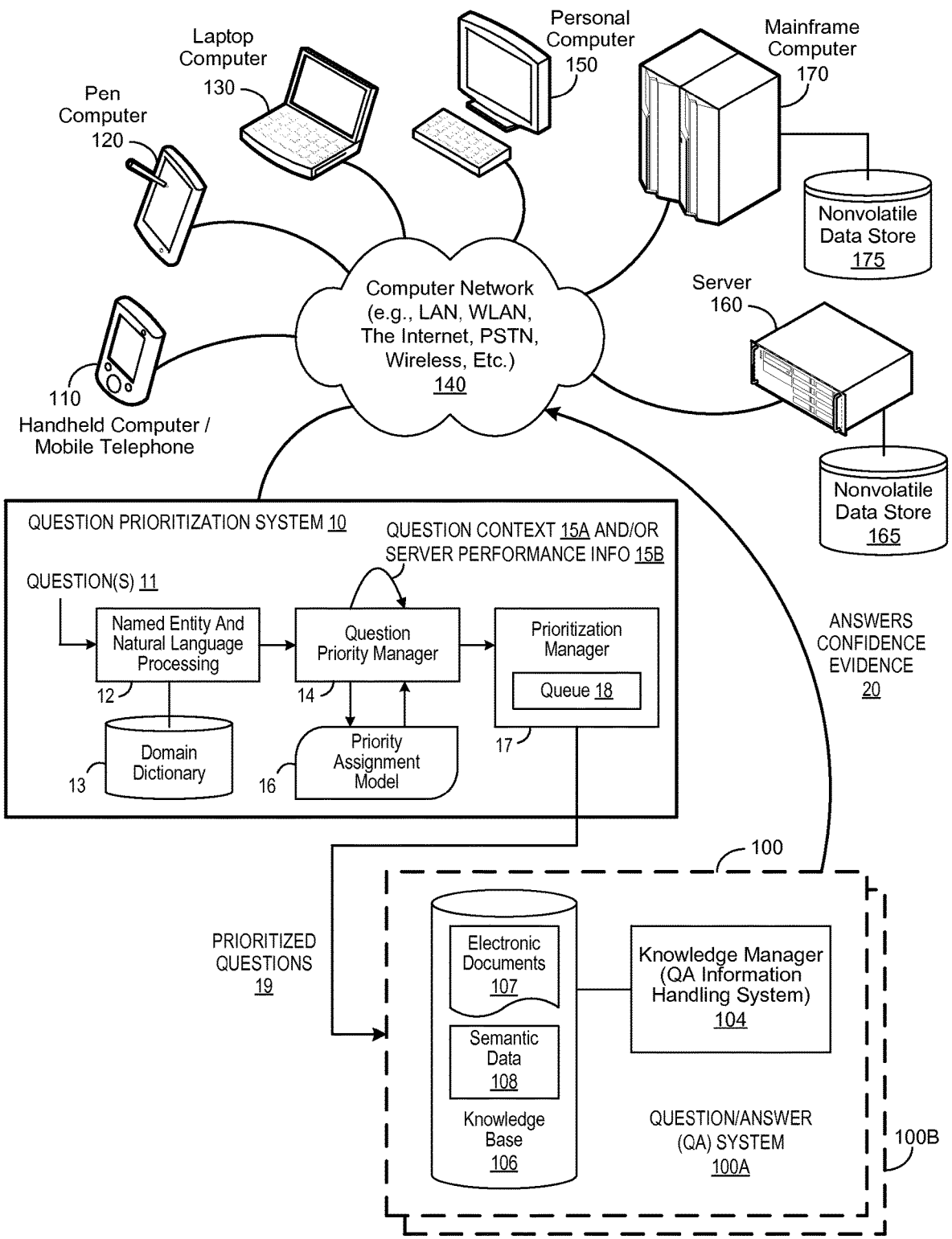
FIG. 1 shows a schematic diagram of a question prioritization system.

Embodiments of the present invention provide asset health diagnostics and prognostics systems which empower owners and/or operators of a complex asset with trusted and valuable insights about repair and maintenance actions. Embodiments of the present invention involve the recognition that it is desirable to provide asset health diagnostics and prognostics systems with adaptive systems where new rules and insights can be learned and dynamically updated to enhance the system capabilities in real time.

Embodiments of the present invention involve the recognition that it is desirable to overcome certain limitations of the art. For example, many known diagnostic systems provide incomplete coverage. Even though these diagnostic systems may cover a sizable portion of repair problems, they do not provide complete coverage for all possible and potential faults and fault patterns that could happen. Additionally, known diagnostic systems are often unable to incorporate real-time updates. When additional new rules and insights are discovered, the new rules often must wait until the next version or software upgrade cycle of the diagnostic system (which is typically once a year) before the new rules are implemented. Additionally, with many known diagnostic systems, software upgrades for diagnostic systems of complex assets can be costly, time consuming, and have a large time cycle between updates.

Accordingly, a system, method, and computer-readable medium are disclosed for performing a complex asset analysis operation. In various embodiments, the complex asset analysis operation includes asset health diagnostics and asset prognostics. More specifically, the complex asset analysis operation performs a crowdsourcing data analysis operation of complex asset crowdsourced data from a plurality of complex assets. The complex asset crowdsourced data includes performance data along with configuration data, maintenance and repair history data, repair diagnostics rules data for each complex asset to allow the complex asset analysis operation to collectively develop a comprehensive repair and maintenance knowledge base to assist in making optimized maintenance and repair decisions. With such a complex asset analysis operation, new maintenance and repair knowledge discovered by one complex asset can be immediately shared and used by other complex assets.

In various embodiments, the complex asset analysis operation includes capturing and sharing (i.e., externalizing) descriptions of problem symptoms and associated snap shots of measurements of key performance parameters during the occurrence of the problem when symptoms are experienced. Also, in various embodiments, the complex asset analysis operation includes associating these snap-shops with additional complex asset data (such as make and model, configuration, repair history including repair actions and costs, etc.) and analyzing this information against a knowledge base of information from a large number (e.g., more than 100) of similar complex assets, for the purpose of identifying and validating the problem either as an existing known issue with prescribed recommended actions, or as a new discovered issue to be vetted and validated. In various embodiments, the large number of similar complex assets may be limited to a particular organization (e.g., a particular owner of complex assets) or may be across a plurality of organizations. In certain embodiments the plurality of organizations have certain similar characteristics which could provide some commonality with respect to the issue. For example, the organizations might all be logistics providers or taxi companies. By providing information across multiple organizations, a small organization receives the advantages and information sharing that would likely not be otherwise available.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human—computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are de-queued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 140. Types of computer network 140 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
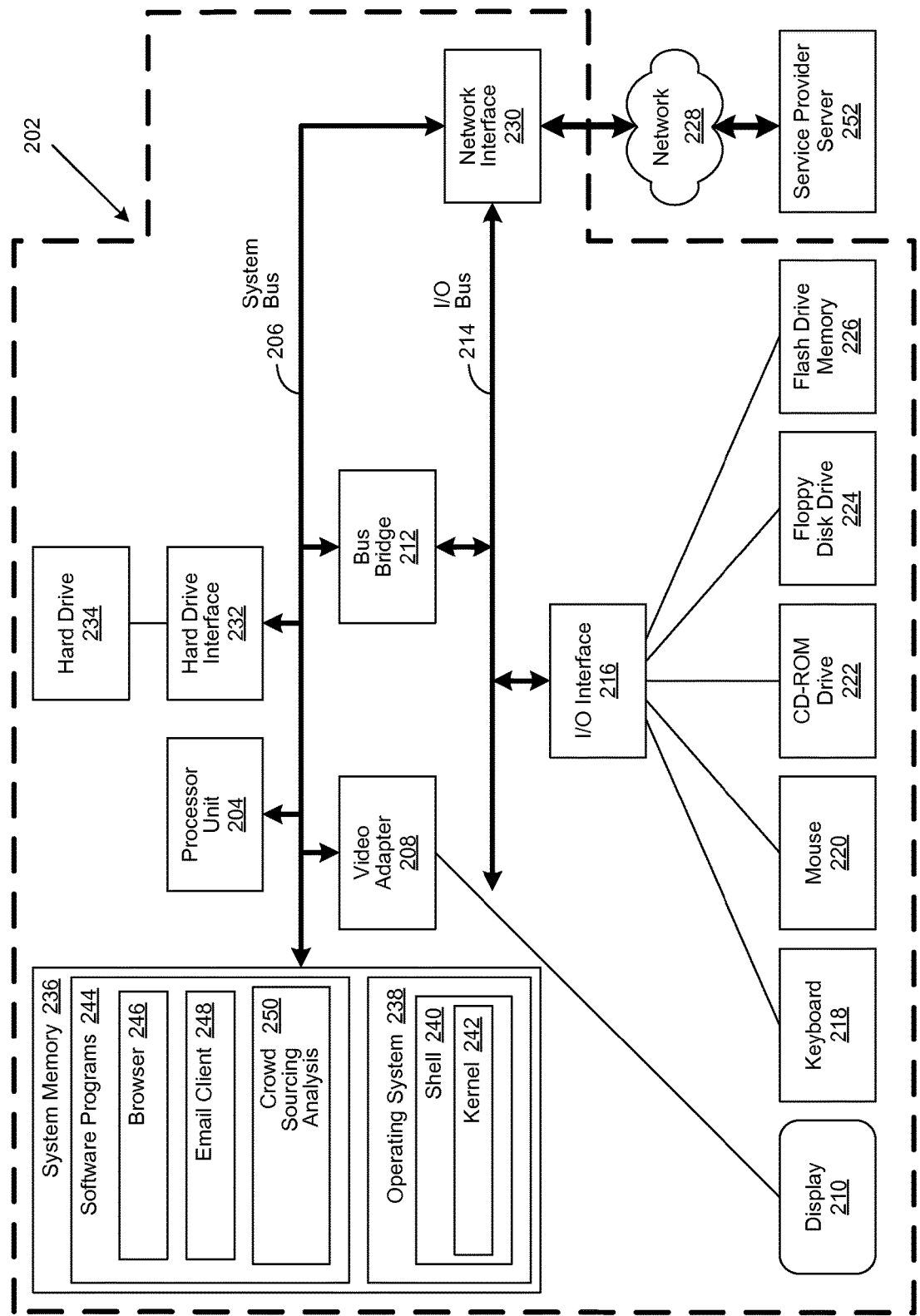
FIG. 2 shows a block diagram of a data processing system.

FIG. 2 illustrates an information handling system 202, more particularly, a processor and common components, which is a simplified example of a computer system capable of performing the computing operations described herein. Information handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information handling system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information handling system 202) to send and receive network messages to the Internet using HyperText Transfer Protocol (HTTP) messaging, thus enabling communication with service provider server 252. In various embodiments, software programs 244 may also include a complex asset analysis module 250. In these and other embodiments, the complex asset analysis module 250 includes code for implementing the processes described hereinbelow. In one embodiment, information handling system 202 is able to download the complex asset analysis module 250 from a service provider server 252.

The hardware elements depicted in the information handling system 202 are not intended to be exhaustive, but rather are representative to highlight components used by the present invention. For instance, the information handling system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
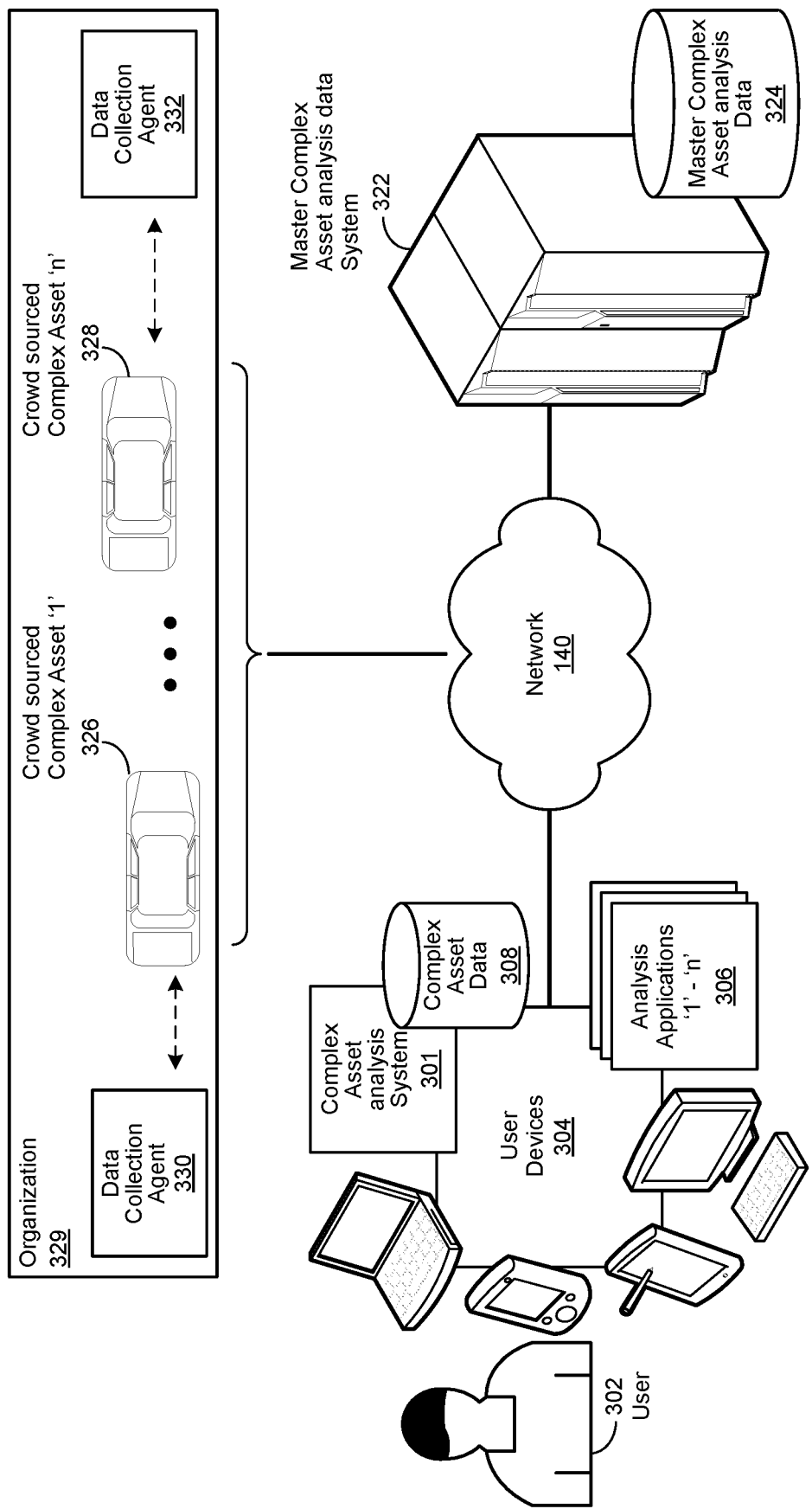
FIG. 3 shows a block diagram of a complex asset analysis environment.

FIG. 3 is a block diagram of a complex asset analysis environment 300 implemented in accordance with an embodiment of the invention. In various embodiments, a plurality of complex assets are monitored to perform a complex asset analysis operation. For the purposes of this disclosure, a complex asset may be defined as a device which includes a plurality of systems such as electrical and/or mechanical systems that operate in concert to allow the device to function properly (i.e., to function as designed). Alternately or additionally, a complex asset may be defined as a device which would need to be capitalized under the definition of a capital asset of the Internal Revenue Service.

In various embodiments, a complex asset analysis system 301 is implemented to execute on a user device 304 and to perform a complex asset analysis operation within the complex asset analysis environment 300. In certain embodiments, the complex asset analysis operation may be performed as a hardware operation, a software operation, or a combination thereof. In certain embodiments, the complex asset analysis system 301 includes some or all of the functions performed by the complex asset analysis module 250.

The complex asset analysis operation receives data from the plurality of crowd sourced complex assets, aggregates the data received from the plurality of crowd sourced complex assets and performs a complex asset analysis operation based upon the crowd sourced complex asset data. The complex asset analysis operation includes asset health diagnostics operations and asset prognostics operations.

As used herein, a user device 304 refers to an information handling system such as a personal computer, a laptop computer, a tablet computer, a personal digital assistant (PDA), a smart phone, a mobile telephone, or other device that is capable of communicating and processing data. In various embodiments, the user device can include one or more analysis applications 306. In various embodiments, the user device 304 includes a repository of complex asset data 308. Also, in certain embodiments the repository of complex asset data 308 includes a crowd sourcing data repository. In certain embodiments, the crowd sourcing data repository may include a crowd sourcing database. Also, in certain embodiments, the complex asset analysis system 301 and the complex asset data 308 may be physically disparate. Also, in certain embodiments, the complex asset analysis system 301 may include a data device agent which executes elsewhere within the complex asset analysis environment 300. Skilled practitioners of the art will realize that many such embodiments are possible and the foregoing is not intended to limit the spirit, scope or intent of the invention.

In various embodiments, the user device 304 is used to communicate data between the complex asset analysis system 301 and a master complex asset analysis data system 322, described in greater detail herein, through the use of a network 140. In certain embodiments, the master complex asset analysis data system 322 includes a repository of master complex asset analysis data 324, likewise described in greater detail herein. In certain embodiments, the master complex asset analysis data 324 is used when performing a complex asset analysis operation of received crowd sourced complex asset data. For example, in certain embodiments, the master complex asset analysis data 324 may include data relating to a plurality of organizations as well as a plurality of different types of complex assets.

In various embodiments, the master complex asset analysis data system 322 can include one or more of a relations database management system (RDBMS), a data warehouse, and a not only structure query language (NoSQL) database. Also, in various embodiments, the master complex asset analysis data system 322 can include one or more cloud based databases (e.g., Cloud DB1, Cloud DB2, Cloud DB3, etc.) Skilled practitioners of the art will realize that many such embodiments are possible and the foregoing is not intended to limit the spirit, scope or intent of the invention.

In various embodiments, the network 140 may be a public network, such as the Internet, a physical private network, a virtual private network (VPN), or any combination thereof. In certain embodiments, the network 140 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including various 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

As used herein, a complex asset profile broadly refers to a profile of a complex asset (or plurality of complex assets such as related complex assets or complex assets within a particular organization) that can be used as a reference when performing a complex asset analysis operation. In various embodiments, the complex asset profile may be generated based upon data that are crowdsourced from a plurality of complex assets, such as crowdsourced complex assets '1' 326 through 'n' 328, some or all of which are owned or operated by a particular organization venue 329. As used herein, crowdsourcing broadly refers to the process of obtaining needed services, content or other information by soliciting contributions from a group of users, devices or systems. Skilled practitioners of the art will be aware that crowdsourcing is often used to subdivide tedious tasks, processes or operations across multiple contributors, each of which adds a portion of value to the greater result. In various embodiments, each of the crowdsourced devices '1' 326 through 'n' 328 includes a respective data collection device (or agent) 330, 332 which provides the respective data of the complex asset to the complex asset analysis system 301 as well as the master complex asset analysis data system 322. Once received, the complex asset data are stored in the repository of complex asset data 308. In various embodiments, the network 140 is used by the crowdsourced devices '1' 326 through 'n' 328 to respectively provide their data to the device 304. In various embodiments, the complex asset data is also stored in the master complex asset analysis data repository 324.

Ongoing operations are then performed to monitor data generated via the crowdsourced complex assets as well as other devices accessing the master crowd sourcing data analysis system 322. Skilled practitioners of the art will recognize that many methods for monitoring queries are possible and the foregoing is not intended to limit the spirit, scope or intent of the invention.

Ongoing operations are then performed to store the crowd sourced complex asset data as it is collected for subsequent comparison and analysis. The method by which the crowd sourced complex asset data is stored, and the format in which it is stored, is a matter of design choice. In various embodiments, the collected complex asset data is stored in the repository of crowd sourced data 308. In certain embodiments, a subset of the collected data is stored in the repository of data 308. For example, data associated with an 'n' number of assets of the environment may be selected for storage in the repository of data 308 where the assets selected for storage may have certain characteristics relevant to the complex asset analysis. For example, in certain embodiments, the users for which the data is stored (and potentially analyzed) may be located within a particular sub-portion of the organization. Skilled practitioners of the art will recognize that many methods for identifying a number of users for analysis are possible and the foregoing is not intended to limit the spirit, scope or intent of the invention.

In certain embodiments, the complex asset crowdsourced data corresponds to a common information model for specifying a complex asset's configuration (as-maintained model), a snap-shot of asset performance parameters during problems, and associated maintenance and repair experience. The common information model represents a diagnostics rule as a mapping from measurements to descriptors to symptoms to faults to failures. The complex asset analysis system 301 discovers these mappings in real time (i.e., with no noticeable delay to a user), and based on this discovery configures and applies newly discovered rules in real-time. In certain embodiments, the discovery of new rules is driven by users reporting and describing abnormal operation with symptoms that are either new symptoms or existing symptoms that do not have pre-defined mappings to the measurement and detected faults associated with the abnormality.

So, the complex asset analysis system 301 discovers and suggests new rules that have not been thought of at design time or previously discovered by the system. For example, as a failure could be caused by one or more faults, and faults may exhibit one or more symptoms, the complex asset analysis system 301 may discover new symptoms for an existing failure and is able to dynamically enhance the rules for diagnosing the failure in question. The complex asset analysis system 301 examines various signals during a reported abnormality and by performing analytics based upon the complex system crowd sourced data, dynamically maps signals and measurements to symptoms of the abnormality.

Additionally, in certain embodiments, the information model groups together concepts with an associated snap shot of asset performance parameters. These concepts can include symptom, probable cause, recommended action, and cost estimate of repair [S, PC, RA, C]. When the rule is validated as working on one asset (e.g., by the asset owner providing an indication that the rule solved the problem), the rule is then shared with other assets to add to their knowledge base and help optimize their maintenance decision when a similar symptom is encountered.

In another embodiment, the user's snapshot of his/her vehicle performance parameters can be used to compare with other users' snapshots of vehicles with the same make, model, year, mileage and the type of roads that the user has traveled. For example, User A does 25% off-roading and he owns a 2009 Toyota FJ Cruiser. That user's vehicle snapshot info can be used to compare with other users who love to take their cars to camping sites and also own a similar vehicle. The output of the comparison of snapshots can generate a trend of whether user A's vehicle is performing at a normal wear and tear situation. The complex asset analysis system 301 can also generate a prediction regarding any upcoming fixes that may be required for individual parts within the asset.

In certain embodiments, the complex asset analysis system 301 and the master complex asset analysis system 322 includes an analytics component and a data collection component. Additionally, in certain embodiments, the complex asset analysis system 301 may be instantiated as a vehicle repair and maintenance optimization services (VRMOS) system. With a VRMOS system, the components would be a VRMOS analytics component and an onboard vehicle data collection device (VDCD) component. The VDCD component includes a device (or agent) that can connect to an on-board diagnostics (OBD) connector of a vehicle and is configured to collect on-board data on demand and share the data with VRMOS analytics component. VRMOS component includes a cognitive system that collects data from a large number of vehicles (e.g., more than a thousand), curates and organizes data by vehicle make/model/year/configuration, etc. and applies analytics to validate data and discover new diagnostics rules and shares repair and maintenance insights. The VRMOS analytics component maintains various related models including a diagnostics rules model that maps measurements to descriptors to symptoms to faults and to failures. VRMOS analyzes the data and can discover new patterns (i.e., rule mappings) and can share with the owner or operator of the vehicle symptoms and associated probable cause, recommended action, and repair cost of the vehicle.

Also, in certain embodiments, the master complex asset analysis system 322 allows pooling of machine data from a plurality of complex assets along with operator performance factors for users of individual complex assets to enable the master complex asset analysis system 322 to generate unique models which can predict and diagnose machine failures as well as encourage adjustment of operator actions that optimize asset usage. In various embodiments, the operator actions can include driving conditions, speeding, abrupt braking, etc. Also, in certain embodiments, the complex asset analysis system 301 can provide certain controls over the complex asset to adjust the operator actions. For example, the complex asset analysis system 301 might have the ability to control acceleration and/or top speed of a vehicle under certain conditions to increase the operating efficiency of the complex asset. Also, in certain embodiments, the control could be changed based upon either individual complex asset data or crowdsourced complex asset data relating to a particular type of complex asset. Also, in certain embodiments, the complex asset analysis system 301 could be used by organizations to generate and manage certain financial aspects of the organization. For example, insurance companies could use the complex asset analysis system 301 to enable pricing models for pay-as-you-drive insurance products. More specifically, auto insurance products and warranties could be priced based in vehicle maintenance and driver performance through these pooled models. Also for example, employers could use the complex asset analysis system 301 to evaluate and remunerate machine operators (e.g., truck drivers or production workers). For example truck drivers could be paid for performance based on safety and vehicle up-time that is managed by feedback through fleet-wide crowdsourced models.

Figure 4:
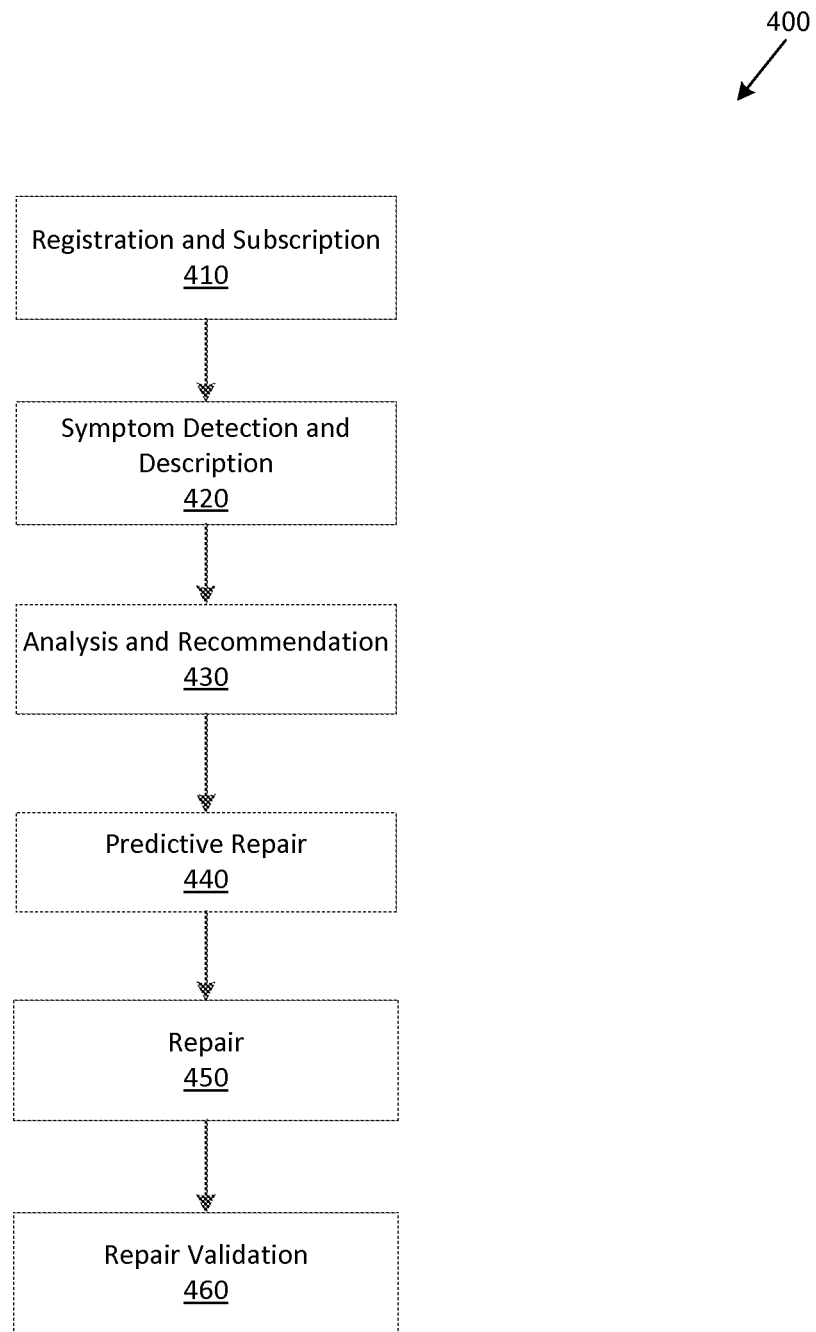
FIG. 4 shows a flow chart of the operation of a complex asset analysis system.

Referring to FIG. 4, a flow chart of the operation of a complex asset analysis system 400 is shown. The operation of the complex asset analysis system 400 includes a plurality of phases (also referred to as steps). In various embodiments, the operation of the complex asset analysis system 400 includes one or more of a registration and subscription phase 410, a symptom detection and description phase 420, an analysis and recommendation phase 430, a predictive repair phase 440, a repair phase 450, and a repair validation phase 460. The interactions between the complex assets and the complex asset analysis system 400 occur in some or all of the plurality of phases.

More specifically, during the registration and subscription phase 410, an owner or operator of a complex asset registers the asset with the complex asset analysis system 400 and subscribes to various services and notifications provided by the complex asset analysis system 400. In various embodiments, the registration process invokes a data collection device (e.g., the data collection agent 330, 332) to provide asset data to the complex asset analysis system 400. In various embodiments, the asset data includes some or all of make data, model data, year data and configuration data of the asset. The configuration data includes as maintained configuration data and as monitored configuration data. Additionally in certain embodiments, during the registration and subscription phase 410 the complex asset analysis system 400 configures with data collection device with any appropriate default data analytics filters.

During the symptom detection and description phase 420, asset performance data is exchanged with the complex asset analysis system 400, especially when symptoms are detected by the data collection device. Symptoms can be detected automatically by the data collection device, or can be detected by an operator of the complex asset or the user of the complex asset analysis system 400 (e.g., user 502). In certain embodiments, the automatic detection is triggered by abnormalities detected by an on-board diagnostics system of the complex asset. These abnormalities can include fault and warning indicators generated by the on-board diagnostics system. When the data collection device detects the abnormalities, the data collection device collects asset performance data for a specified time interval and provides the data to the complex asset analysis system 400. In certain embodiments, the data collection device also generates advisories to the operator indicating the likely symptoms, probable cause, and recommend action for these abnormalities. The operator may validate the advisory at a later time, or describe new symptoms if the symptoms differ from the advisory.

An operator of the asset can also trigger data collection when the operator encounters symptoms of degraded performance or faults. The operator can describe (either verbally via a natural language interface, or via a graphical user interface GUI)) the symptoms to the complex asset analysis system 400. The complex asset analysis system 400 then attempts to map the described symptoms to a common symptom ontology. The refined symptoms are then associated with the collected performance data for the asset and prepared for analysis.

During the analysis and recommendation phase 430, the complex asset analysis system 400 sends advisories to the owner or operator of the asset regarding the symptoms encountered. The advisories can include probable causes, recommended action, and estimated cost. In various embodiments, the advisories are a result of predictive analytics completed by the complex asset analysis system 400 on data from similar vehicles that encountered similar situations. These advisories greatly assist and empower the owner or operator of the asset when bringing the asset to a repair shop.

In various embodiments, the detected symptoms and associated data fall under at least one of three categories as a result of analysis. With a first category, the detected symptoms match with a high degree of confidence to an existing situation with an identified diagnostics mapping (i.e., a mapping among measurements, descriptors, symptoms, faults, and failures). With a second category, the detected symptoms match to an existing situation and symptoms but not to an existing mapping. With this category, the complex asset analysis system 400 discovers new mappings. With a third category, the detected symptoms do not match to any previous situation or mappings (indicating that the symptoms encountered are unique and have not been encountered before by other assets). In this category, the case is documented as a new occurrence to be corroborated by other assets in future analysis before declaring it as a newly discovered rule with some degree of confidence.

During the predictive repair phase 440, a snapshot of performance information of the asset including make, model, year, mileage together with the usage information (e.g., the types of roads that the asset has driven) are compared to other snapshots of the same or similar asset that include the same or similar usage information. An analysis of individual parts of the asset can be generated to determine whether the asset is wearing out in a normal rate. Individual parts that do not perform within the range of normal wear and tear can be identified. In various embodiments, a list of upcoming fixes is also predicted.

During the repair phase 450, an owner or operator brings the asset to an appropriate location for repair. The insightful advisories provided by the complex asset analysis system 400 assist the owner or operator in obtaining the best possible result from the repair. Additionally, in certain embodiments, the complex asset analysis system 400 shares the specific situation and advisories with the diagnostics system in the repair shop. In various embodiments, repair transaction information including what work was performed and the cost of the work can be provided to the complex asset analysis system 400 either by the repair shop system (with the acknowledgement of the owner) or by the owner directly.

During the repair validation phase 460, the complex asset analysis system 400 follows the repair action and involves validation by the asset data collection device as well as possibly the owner or operator whether the vehicle is operating normally or not. Validated repairs are then used by the complex asset analysis system 400 to increase the confidence of analytics of the complex asset analysis system 400 including confidence in new rules and mappings, and recommendations.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A system comprising:
a processor;
a data bus coupled to the processor; and
a non-transitory, computer readable storage medium embodying computer program code for performing a complex asset analysis operation within a complex asset analysis environment comprising a plurality of crowd sourced complex assets and a complex asset analysis system communicating via a network, the non-transitory, computer-readable storage medium being coupled to the data bus, the computer program code comprising instructions executable by the processor and configured for:
receiving crowdsourced data from the plurality of crowd sourced complex assets via the network, each of the plurality of crowd sourced complex assets comprising a physical device comprising a combination of sub-systems, comprising one or more electrical systems and one or more mechanical systems, which operate in concert to allow the crowd sourced complex asset to function, and further comprising a data collection agent and wherein each of the crowd sourced complex assets provide a corresponding portion of crowdsourced data to the complex asset analysis system via a corresponding data collection agent, each portion of the crowdsourced data specifying a configuration of a corresponding crowd sourced complex asset of the plurality of crowdsourced complex assets and a snap shot of asset performance parameters during abnormal operation of the corresponding crowd sourced complex asset, and wherein each crowd sourced complex asset of the plurality of crowd sourced complex assets comprises an on-board diagnostics system that automatically detects abnormalities in operations of the crowd sourced complex asset and initiates collection of a corresponding portion of the crowdsourced data and transmission of the crowdsourced data to the complex asset analysis system;
performing the complex asset analysis operation based upon the crowdsourced data received from the plurality of crowd sourced complex assets at least by generating, based on analytics performed by a cognitive computing system of the complex asset analysis system, for a portion of the crowdsourced data, a new diagnostic rule data structure that maps measurements of the asset performance parameters to a descriptor of the abnormal operation, to symptoms of the abnormal operation, to at least one fault, associated with the abnormal operation, of at least one component of the crowd sourced complex asset, to a failure associated with at least one sub-system of the crowd sourced complex asset;
sending the new diagnostic rule to at least one other complex asset for updating a knowledge base stored in association with the on-board diagnostic system of the at least one other complex asset; and
controlling problem diagnostics of the at least one other complex asset based upon individual complex asset data and the new diagnostic rule data structure.

2. The system of claim 1, wherein:
the complex asset analysis operation organizes data for each of the plurality of crowd sourced complex assets based upon asset make, model and year of manufacture; and
each of the plurality of crowd sourced complex assets provides configuration information, the configuration information comprising at least one of as built configuration information, as maintained configuration information, or as monitored configuration information.

3. The system of claim 1, wherein:
each of the plurality of crowd sourced complex assets register respective complex asset data and subscribe for content notifications based on a type and configuration of the complex asset.

4. The system of claim 1, wherein:
the complex asset analysis operation, for a portion of the crowdsourced data received from at least one of the crowd sourced complex assets, comprises grouping together concepts with an associated snap shot of asset performance parameters, the concepts comprise symptom, probable cause, recommended action, and cost estimate of repair.

5. The system of claim 4, wherein:
the complex asset analysis operation generates notifications for at least one crowd sourced complex asset of the plurality of crowd sourced complex assets based upon other crowd sourced complex assets of the plurality of crowd sourced complex assets, wherein the at least one crowd sourced complex asset is one or more crowd sourced complex assets having at least one crowd sourced complex asset characteristic in common with the other crowd sourced complex assets of the plurality of crowd sourced complex assets, wherein the at least one crowd sourced complex asset characteristic comprises a characteristic identifying a physical type of a corresponding crowd sourced complex asset.

6. A computer-readable storage medium embodying computer program code, the computer program code comprising computer executable instructions configured for:
receiving crowdsourced data from the plurality of crowd sourced complex assets via the network, each of the plurality of crowd sourced complex assets comprising a physical device comprising a combination of sub-systems, comprising one or more electrical systems and one or more mechanical systems, which operate in concert to allow the crowd sourced complex asset to function, and further comprising a data collection agent and wherein each of the crowd sourced complex assets provide a corresponding portion of crowdsourced data to the complex asset analysis system via a corresponding data collection agent, each portion of the crowdsourced data specifying a configuration of a corresponding crowd sourced complex asset of the plurality of crowd sourced complex assets and a snap shot of asset performance parameters during abnormal operation of the corresponding crowd sourced complex asset, and wherein each crowd sourced complex asset of the plurality of crowd sourced complex assets comprises an on-board diagnostics system that automatically detects abnormalities in operations of the crowd sourced complex asset and initiates collection of a corresponding portion of the crowdsourced data and transmission of the crowdsourced data to the complex asset analysis system;
performing the complex asset analysis operation based upon the crowdsourced data received from the plurality of crowd sourced complex assets at least by generating, based on analytics performed by a cognitive computing system of the complex asset analysis system, for a portion of the crowdsourced data, a new diagnostic rule data structure that maps measurements of the asset performance parameters to a descriptor of the abnormal operation, to symptoms of the abnormal operation, to at least one fault, associated with the abnormal operation, of at least one component of the crowd sourced complex asset, to a failure associated with at least one sub-system of the crowd sourced complex asset;

sending the new diagnostic rule to at least one other complex asset for updating a knowledge base stored in association with the on-board diagnostic system of the at least one other complex asset; and controlling problem diagnostics of the at least one other complex asset based upon individual complex asset data and the new diagnostic rule data structure.

7. The computer-readable storage medium of claim 6, wherein:

the complex asset analysis operation organizes data for each of the plurality of crowd sourced complex assets based upon asset make, model and year of manufacture; and each of the plurality of crowd sourced complex assets provides configuration information, the configuration information comprising at least one of as built configuration information, as maintained configuration information, or as monitored configuration information.

8. The computer-readable storage medium of claim 6, wherein:

the complex asset analysis operation, for a portion of the crowdsourced data received from at least one of the crowd sourced complex assets, comprises grouping together concepts with an associated snap shot of asset performance parameters, the concepts comprise symptom, probable cause, recommended action, and cost estimate of repair.

9. The computer-readable storage medium of claim 8, wherein:

the complex asset analysis operation generates notifications for at least one crowd sourced complex asset of the plurality of crowd sourced complex assets based upon other crowd sourced complex assets of the plurality of crowd sourced complex assets, wherein the at least one crowd sourced complex asset is one or more crowd sourced complex assets having at least one crowd sourced complex asset characteristic in common with the other crowd sourced complex assets of the plurality of crowd sourced complex assets, wherein the at least one crowd sourced complex asset characteristic comprises a characteristic identifying a physical type of a corresponding crowd sourced complex asset.

10. The system of claim 1, wherein the crowd sourced complex assets are vehicles, and wherein the instructions executable by the processor are further configured for:

comparing the snap shot of performance parameters for a selected corresponding crowd sourced complex asset to other snap shots of other crowd sourced complex assets in the plurality of crowd sourced complex assets, the other crowd sourced complex assets having at least one device characteristic in common with the selected corresponding crowd sourced complex asset, and wherein the at least one device characteristic comprises at least one of a make, model, year, mileage, and type of roads the vehicle is operated on; and generating a trend output based on results of the comparison, wherein the trend output indicates whether or not the abnormal condition is associated with normal wear and tear on the vehicle.

11. The system of claim 1, wherein the crowd sourced complex assets are vehicles, and wherein the instructions executable by the processor are further configured for:

generating a pay-as-you-drive insurance product pricing model, based on results of the complex asset analysis operation, in which vehicle insurance products and warranties are priced based on vehicle maintenance and driver performance identified via the complex analysis operation.

12. A method, in a data processing system comprising a processor and a memory, the memory comprising instructions which are executed by the processor to specifically configure the processor to perform a complex asset analysis operation within a complex asset analysis environment comprising a plurality of crowd sourced complex assets and a complex asset analysis system communicating via a network, and to execute the method comprising:

receiving crowdsourced data from the plurality of crowd sourced complex assets via the network, each of the plurality of crowd sourced complex assets comprising a physical device comprising a combination of subsystems, comprising one or more electrical systems and one or more mechanical systems, which operate in concert to allow the crowd sourced complex asset to function, and further comprising a data collection agent, and wherein each of the crowd sourced complex assets provide a corresponding portion of crowdsourced data to the complex asset analysis system via a corresponding data collection agent, each portion of the crowdsourced data specifying a configuration of a corresponding crowd sourced complex asset of the plurality of crowdsourced complex assets and a snap shot of asset performance parameters during abnormal operation of the corresponding crowd sourced complex asset, and wherein each crowd sourced complex asset of the plurality of crowd sourced complex assets comprises an on-board diagnostics system that automatically detects abnormalities in operations of the crowd sourced complex asset and initiates collection of a corresponding portion of the crowdsourced data and transmission of the crowdsourced data to the complex asset analysis system;

performing the complex asset analysis operation based upon the crowdsourced data received from the plurality of crowd sourced complex assets at least by generating, based on analytics performed by a cognitive computing system of the complex asset analysis system, for a portion of the crowdsourced data, a new diagnostic rule data structure that maps measurements of the asset performance parameters to a descriptor of the abnormal operation, to symptoms of the abnormal operation, to at least one fault, associated with the abnormal operation, of at least one component of the crowd sourced complex asset, to a failure associated with at least one sub-system of the crowd sourced complex asset;

sending the new diagnostic rule to at least one other complex asset for updating a knowledge base stored in association with the on-board diagnostic system of the at least one other complex asset; and controlling problem diagnostics of the at least one other complex asset based upon individual complex asset data and the new diagnostic rule data structure.

13. The method of claim 12, wherein:

the complex asset analysis operation organizes data for each of the plurality of crowd sourced complex assets based upon asset make, model and year of manufacture; and each of the plurality of crowd sourced complex assets provides configuration information, the configuration information comprising at least one of as built configuration information, as maintained configuration information, or as monitored configuration information.

14. The method of claim 12, wherein:
each of the plurality of crowd sourced complex assets register respective complex asset data and subscribe for content notifications based on a type and configuration of the complex asset.

15. The method of claim 12, wherein:
the complex asset analysis operation, for a portion of the crowdsourced data received from at least one of the crowd sourced complex assets, comprises grouping together concepts with an associated snap shot of asset performance parameters, the concepts comprise symptom, probable cause, recommended action, and cost estimate of repair.

16. The method of claim 15, wherein:
the complex asset analysis operation generates notifications for at least one crowd sourced complex asset of the plurality of crowd sourced complex assets based upon other crowd sourced complex assets of the plurality of crowd sourced complex assets, wherein the at least one crowd sourced complex asset is one or more crowd sourced complex assets having at least one of the crowd sourced complex asset characteristic in common with the other crowd sourced complex assets of the plurality of crowd sourced complex.

17. The method of claim 12, wherein the crowd sourced complex assets are vehicles, and wherein the method further comprises:
comparing the snap shot of performance parameters for a selected corresponding crowd sourced complex asset to other snap shots of other crowd sourced complex assets in the plurality of crowd sourced complex assets, the other crowd sourced complex assets having at least one device characteristic in common with the selected corresponding crowd sourced complex asset, and wherein the at least one device characteristic comprises at least one of a make, model, year, mileage, and type of roads the vehicle is operated on; and
generating a trend output based on results of the comparison, wherein the trend output indicates whether or not the abnormal condition is associated with normal wear and tear on the vehicle.

18. The method of claim 12, wherein the crowd sourced complex assets are vehicles, and wherein the method further comprises:
generating a pay-as-you-drive insurance product pricing model, based on results of the complex asset analysis operation, in which vehicle insurance products and warranties are priced based on vehicle maintenance and driver performance identified via the complex analysis operation.

* * * * *